US009819758B2

(12) United States Patent
Chen et al.

(10) Patent No.: US 9,819,758 B2
(45) Date of Patent: Nov. 14, 2017

(54) REMOTE DEBUGGING INTO MOBILE WEB APPLICATIONS ACROSS DEVICES

(71) Applicant: SAP SE, Walldorf (DE)

(72) Inventors: Zihan Chen, Shanghai (CN); Minghui Cao, Shanghai (CN); Jianrong Yu, Shanghai (CN); Weiyi Cui, Shanghai (CN); Xiao Xu, Shanghai (CN); Yihong Tang, Shanghai (CN); Zhenyu Lu, Shanghai (CN)

(73) Assignee: SAP SE, Walldorf (DE)

( * ) Notice: Subject to any disclaimer, the term of this patent is extended or adjusted under 35 U.S.C. 154(b) by 158 days.

(21) Appl. No.: 14/264,031

(22) Filed: Apr. 28, 2014

(65) Prior Publication Data

US 2015/0309916 A1     Oct. 29, 2015

(51) Int. Cl.
| | |
|---|---|
| *G06F 9/44* | (2006.01) |
| *H04L 29/08* | (2006.01) |
| *H04W 4/18* | (2009.01) |
| *H04W 88/18* | (2009.01) |
| *G06F 11/36* | (2006.01) |

(52) U.S. Cl.
CPC .......... *H04L 67/28* (2013.01); *G06F 11/3624* (2013.01); *H04W 4/18* (2013.01); *H04W 88/182* (2013.01)

(58) Field of Classification Search
CPC .. G06F 11/3664; G06F 11/3624; H04L 67/28; H04W 4/18; H04W 88/182
See application file for complete search history.

(56) References Cited

U.S. PATENT DOCUMENTS

| | | | | | |
|---|---|---|---|---|---|
| 5,835,699 | A | * | 11/1998 | Kimura | ............... G06F 11/362 714/34 |
| 8,185,607 | B1 | * | 5/2012 | Arzur | ................. H04W 4/18 709/203 |
| 8,627,446 | B1 | * | 1/2014 | Eaton | ................. H04L 67/28 726/12 |
| 9,516,129 | B2 | * | 12/2016 | Luna | .................. H04L 67/2842 |
| 9,645,910 | B1 | * | 5/2017 | Kaila | ................. G06F 11/3624 |
| 9,686,371 | B2 | * | 6/2017 | Cohen | ................ H04L 67/2833 |
| 2004/0243979 | A1 | | 12/2004 | Pugh et al. | |
| 2005/0172168 | A1 | * | 8/2005 | Kilian | .................. G06F 11/362 714/31 |

(Continued)

FOREIGN PATENT DOCUMENTS

| | | |
|---|---|---|
| WO | 2009037106 | 3/2009 |
| WO | 2013121394 | 8/2013 |

OTHER PUBLICATIONS

Haeng-Kon Kim, "Mobile Applications Software Testing Methodology", [Online], 2012, pp. 158-166, [Retrieved from Internet on Feb. 17, 2017], <http://download.springer.com/static/pdf/708/chp%253A10.1007%252F978-3-642-35270-6_22.pdf>.*

(Continued)

*Primary Examiner* — Ziaul A Chowdhury (57) ABSTRACT

Disclosed herein are technologies for remote debugging in mobile web applications using a platform-independent debugging proxy server. Particularly, the debugging proxy server acts as an intermediary by fetching and performing instrumentation on a requested webpage by a target browser. This Abstract is submitted with the understanding that it will not be used to interpret or limit the scope or meaning of the claims.

18 Claims, 8 Drawing Sheets

(56) References Cited

U.S. PATENT DOCUMENTS

| | | | | |
|---|---|---|---|---|
| 2005/0229160 | A1* | 10/2005 | Rothman | G06F 11/362 717/124 |
| 2006/0212758 | A1* | 9/2006 | Drake | G06F 11/3664 714/38.13 |
| 2006/0235941 | A1* | 10/2006 | Arcas | H04L 67/2823 709/217 |
| 2006/0277528 | A1* | 12/2006 | Chen | G06F 11/3624 717/124 |
| 2008/0201453 | A1* | 8/2008 | Assenmacher | G06F 11/3664 709/219 |
| 2008/0209120 | A1* | 8/2008 | Almog | H04L 67/2852 711/106 |
| 2010/0095197 | A1 | 4/2010 | Klevenz et al. | |
| 2010/0153921 | A1 | 6/2010 | Klein | |
| 2010/0325615 | A1* | 12/2010 | Ramot | G06F 11/3672 717/124 |
| 2011/0004790 | A1* | 1/2011 | Rossmann | G06F 11/3644 714/27 |
| 2011/0067004 | A1* | 3/2011 | Birsan | G06F 11/3664 717/125 |
| 2012/0102466 | A1* | 4/2012 | Bates | G06F 11/3624 717/125 |
| 2012/0143980 | A1* | 6/2012 | Johansson | H04W 4/18 709/217 |
| 2012/0173901 | A1* | 7/2012 | Soliman | H04W 88/182 713/320 |
| 2013/0030868 | A1* | 1/2013 | Lyon | G06Q 30/0236 705/7.33 |
| 2013/0142050 | A1* | 6/2013 | Luna | H04L 67/32 370/241 |
| 2014/0089904 | A1* | 3/2014 | Wray | G06F 11/3672 717/135 |
| 2014/0156852 | A1* | 6/2014 | Moon | G06F 11/3664 709/226 |
| 2014/0226482 | A1* | 8/2014 | Lv | H04W 4/18 370/235 |
| 2014/0245126 | A1* | 8/2014 | Sharma | G06F 17/2247 715/234 |
| 2015/0135165 | A1* | 5/2015 | Simernitski | G06F 11/362 717/124 |
| 2015/0178251 | A1* | 6/2015 | Guggisberg | H04L 67/42 715/234 |

OTHER PUBLICATIONS

David Ungar et al. Constructing a Metacircular Virtual Machine in an Exploratory Programming Environment, [Online], 2005, pp. 11-20, [Retrieved from Interent on Jul. 10, 2017], <http://delivery.acm.org/10.1145/1100000/1094865/p11-ungar.pdf>.*

Ivan Povazan et al., "Debug proxy server for DSP platforms", [Online], 2015, pp. 1-4, [Retrieved from Interent on Jul. 10, 2017], <http://ieeexplore.ieee.org/stamp/stamp.jsp?arnumber=7867148>.*

Panayiotis Neophytou et al., "Debugging MPI Grid applications using Net-dbx", [Online], 2004, pp. 1-11, [Retrieved from Internet on Jul. 10, 2017], <https://www.researchgate.net/profile/Paraskevas_Evripidou/publication/2953059_Debugging_MPI_Grid_Applicationst-dbx/links/0c96051a6461df1eaf000000.pdf>.*

Hzia Zozr et al., "Prototyping SIP-based VoIP Services in Java", [Online], 2000, pp. 1395-1399, [Retrieved from Internet on Jul. 10, 2017], <http://ieeexplore.ieee.org/stamp/stamp.jsp?arnumber=890924>.*

Haruka Kikuchi et al., Javascript Instrumentation in Practice, Aplas 2008, pp. 326-341, LNCS 5356, Springer-Verlag Berlin Heidelberg, 2008.

Ashutosh Jagdish Sharma, Better Web Development with WebKit Remote Debugging, WWW2012 Developer Track, Apr. 18-20, 2012, 4 pages, Lyon, France.

Pavel Feldman, WebKit Remote Debugging, https://webkit.org/blog/1620/webkit-remote-debugging/, Surfin' Safari, May 9, 2011.

Mozilla Wiki, Remote Debugging Protocol, https://wiki.mozilla.org/Remote_Debugging_Protocol, 2013.

* cited by examiner

```
$(function() {                                          [add instrument
                                                         build a function --
                                                         line mapping]
  debugger.initialFunctionMap(this,{name:'<anonymous>',
  line:1},{name:'showApplyForm,line:74},'http://localhost:8080/js/main.js',0);

[add instrument]
  debugger.tryToBreak('http://localhost:8080/js/main. js', 1);
  'use strict';
                                                        [add instrument]
  debugger.tryToBreak('http://localhost:8080/js/main.js', 5 , false);

$('input, textarea').placeholder();                   [add instrument]

debugger.tryToBreak('http://localhost:8080/js/main.js', 7, false);
  ..........
  function showApplyForm() {                            [add instrument]

debugger.tryToBreak('http://localhost:8080/js/main.js', 31,false);

$(".apply-form").show();                            [add instrument]

debugger.tryToBreak('http://localhost:8080/js/main.js', 32,false);

$("#apply-link").addClass('link-active');
    ............
  }
  ............
});
```

FIG. 7

```
window.debugger = function(){
    var breakPoints = {}, functionMappings ={}, commands={};
    ............
    var _initialFunctionMap = function(){
        ............
        if(arguments.length >2){
            var self = arguments[0], url = arguments[length-2];
            for(var i=1; i<length; i++)}
            {
                var functionName = arguments[i].name, functionLine = arguments[i].line;
                functionMappings[functionName] = encodeURIComponent(url + "#" + functionLine);
                breakPoints[url+"#"+functionLine] = false;
            }
            ............
    };
    ............
    var _tryToBreak = function(url, linenumber, forcebreak){
        var shouldBrk = shouldBreakAt(url, linenumber);
        if(shouldBrk){
            loopForDebugger(url, linenumber);
        }
        ............
    };
    var loopForDebugger = function(url, linenumber){
        while(shouldBreakAt(url, linenumber)) {
        |   if(!evalCommand()) {
            break;
            }
        }
        ............
    };
    return {
        tryToBreak: _tryToBreak,
        initialFunctionMap : _initialFunctionMap
        ............
    };
};
```

FIG. 8

REMOTE DEBUGGING INTO MOBILE WEB APPLICATIONS ACROSS DEVICES

TECHNICAL FIELD

The present disclosure relates generally to remote debugging of mobile web applications across devices with different operating systems or browser applications.

BACKGROUND

Coded software applications may typically contain errors in the code. Although some coded software applications are error-free, in other instances, a software programmer may play it safe by installing debugging code in the coded software applications.

Errors in coded software application are referred to as "bugs." The process of correcting these errors is referred to as "debugging." While extensive debugging may be implemented by a software programmer as to coded software applications during construction, many "bugs" may often not be readily apparent until the application has executed in real world conditions.

Debugging applications may be limited by the operating system installed in mobile devices. For example, HTML5® & JavaScript® are increasingly adopted in mobile application development. In this example, a critical problem may arise as to how the JavaScript may be debugged on these mobile devices, especially, for example, on Android implemented devices.

SUMMARY

A framework for cross-platform remote debugging in mobile web applications is described herein. In accordance with one aspect of the framework, a proxy server fetches a webpage, performs instrumentation on the fetched webpage and forwards the instrumented webpage to a target browser. The instrumented webpage may then be debugged through the proxy server.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are technologies for remote debugging of mobile web applications across devices with different operating systems and/or browser applications. Examples of users include individuals, business or corporate entities, etc. The technologies herein may be applied to computing and mobile applications.

Figure 1:
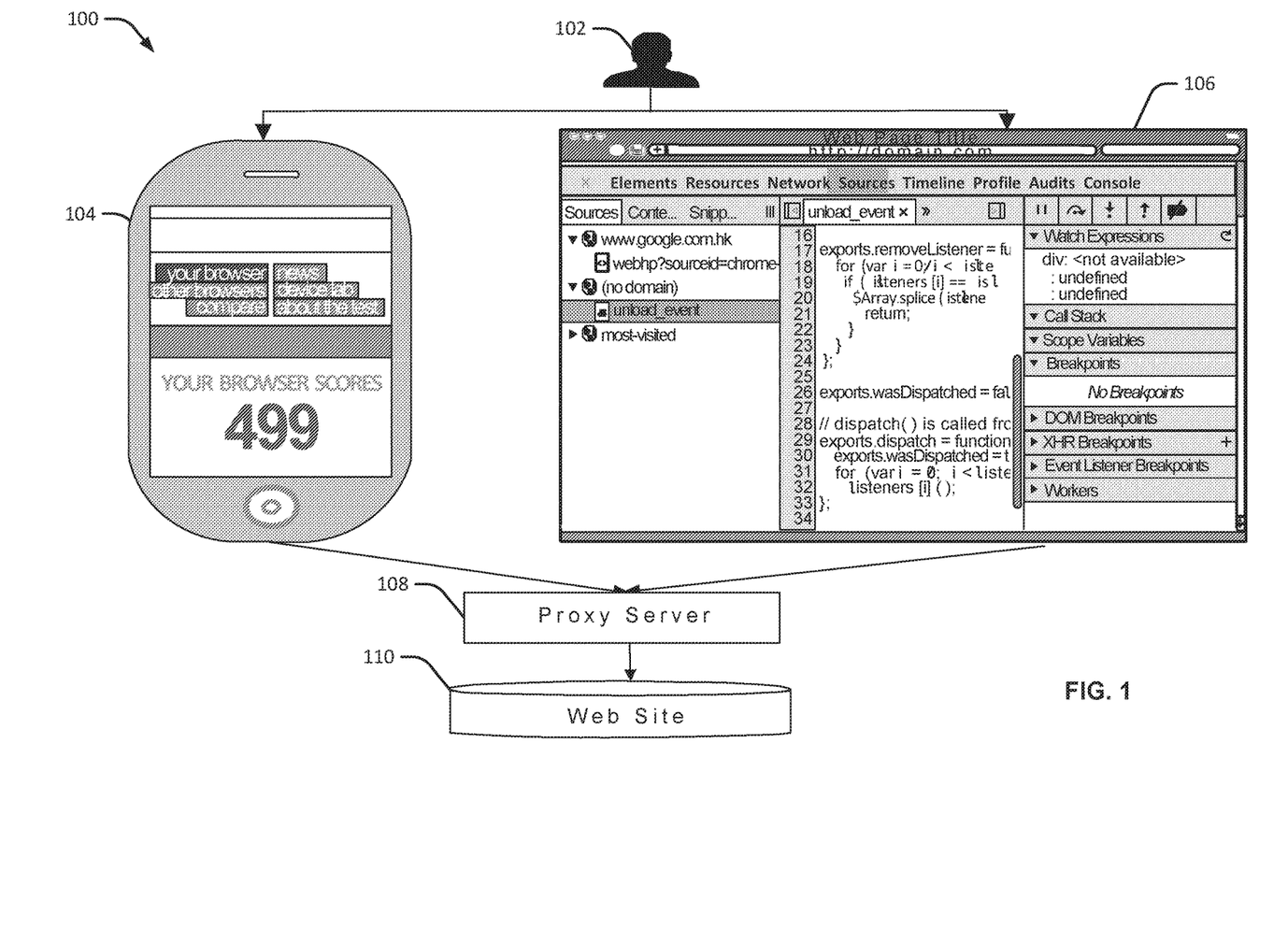
FIG. 1 illustrates an exemplary scenario that shows an overview of a cross-platform remote debugging in mobile web applications.

FIG. 1 shows an example scenario 100 that illustrates an overview of a cross-platform remote debugging in mobile web applications. As shown, the scenario 100 illustrates a user 102, a device 104, a development tool 106, a proxy server 108, and a Website 110.

As an initial overview of the scenario 100, the device 104 tries to load a webpage (not shown) from the website 110 (i.e., server). The proxy server 108 fetches the webpage from the website 110 and performs instrumentation on a JavaScript® code of the fetched webpage. Thereafter, the device 104, and particularly its target browser (not shown), receives and loads the instrumented webpage. At this stage, the instrumented webpage is now capable of being debugged independent of the platform that is operating at the device 104.

Examples of such device 104 may include (but are not limited to) a mobile phone, a cellular phone, a smartphone, a personal digital assistant, a tablet computer, a netbook, a notebook computer, a laptop computer, a multimedia playback device, a digital music player, a digital video player, a navigational device, a digital camera, and the like.

In an implementation, the device 104 may run different mobile web applications in its browser or operating system. For example, where the device 104 utilizes an Android® operating system (OS), the device 104 may run the mobile web applications in WebView®. In another example, where the device 104 utilizes an iPhone® OS (iOS), the device 104 may run the mobile web applications in UIWebView®.

The device 104 may utilize other types of operating systems to run the mobile web applications and it is not limited to the examples described above.

In an implementation, the development tool 106 may include a set of web authoring and debugging tools built into the operating system of the device 104. For example, a Google® Chrome® Developer Tool may enable web developers (e.g., user 102) to gain deep access into the internals of the browser and their web applications. In another example, the development tool 106 may be used to efficiently track down layout issues, set JavaScript® breakpoints, and get insights for code optimization.

In an implementation, a remote debugging client (not shown) may utilize the development tool 106 to access the proxy server 108. In this implementation, the remote debugging client may perform debugging of the webpage at the proxy server 108 rather than at the actual device 104.

The proxy server 108 may be another computing device or self-based software configured to facilitate debugging of the webpage. For example, the device 104 tries to load the webpage fetched by the proxy server 108. In this example, the proxy server 108 acts as middleware between the device 104 and the website 110. Similarly, the development tool 106 acts a middleware between the remote debugging client and the proxy server 108.

With the fetched webpage, the proxy server 108 may condition or perform instrumentation, for example, on the code of the fetched webpage. After instrumentation, the proxy server 108 communicates the instrumented webpage back to the device 104.

With the instrumented webpage loaded and running at the target browser of the device 104, the remote debugging client may be able to implement cross-platform debugging of the instrumented webpage.

Although the device 104, the development tool 106, and the proxy server 108 are shown to be separate and independent from one another, the device 104, development tool 106, and the proxy server 108 may be integrated as a single unit.

Figure 2:
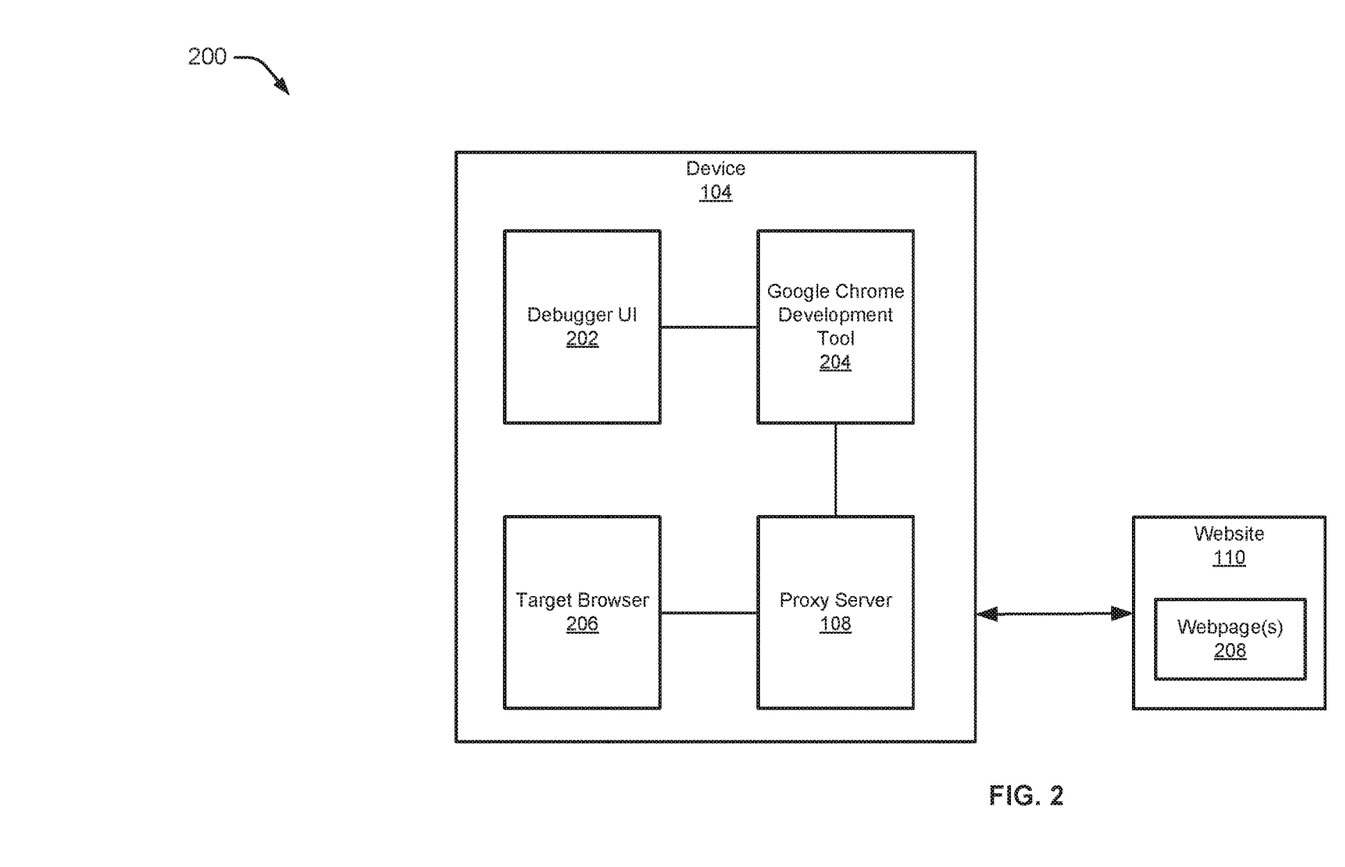
FIG. 2 illustrates an exemplary block diagram that shows cross-platform remote debugging in mobile web applications.

FIG. 2 shows an example block diagram 200 illustrating an example implementation of cross-platform remote debugging in mobile web applications.

The block diagram 200 shows the device 104 to include a debugger user interface (UI) 202, a Google® Chrome® Development Tool 204, a target browser 206 and the proxy server 108. Furthermore, block diagram 200 shows a separate website 110 that may include one or more webpage(s) 208.

In an implementation, the user 102 enables a debugging feature of the device 104. With the debugging feature enabled, the target browser 206 may try to load the webpage 208 and send a webpage request to the proxy server 108. The proxy server 108 receives this request and fetches the requested webpage 208 from the website 110. In other words, the target browser 206 may load the webpage 208 indirectly through the proxy server 108 as the go-between.

Upon fetching of the webpage 208 by the proxy server 108, the proxy server 108 may perform instrumentation (e.g., run a program or execute a function) over a JavaScript® code of the webpage 208. The program or function may transform the JavaScript® code to be capable of manipulation such as for debugging purposes. In other words, the proxy server 108 may act as a middleware with a self-based program protocol to facilitate life cycle of debugging as further described in FIG. 3.

For debugging purposes, the debugger UI 202 utilizes the Google® Chrome® development tool 204 to gain access to the proxy server 108. In an implementation, the debugger UI 202 may perform debugging on the instrumented webpage 208 through the proxy server 108. In this implementation, the debugging will be independent of the operating system or other browser that is utilized by the target browser 206.

As shown, the debugger UI 202 may be a remote debugging client application that is installed in the device 104. On the other hand, the Google® Chrome® development tool 204 is a specific type of development tool that is developed by Google®.

Figure 3:
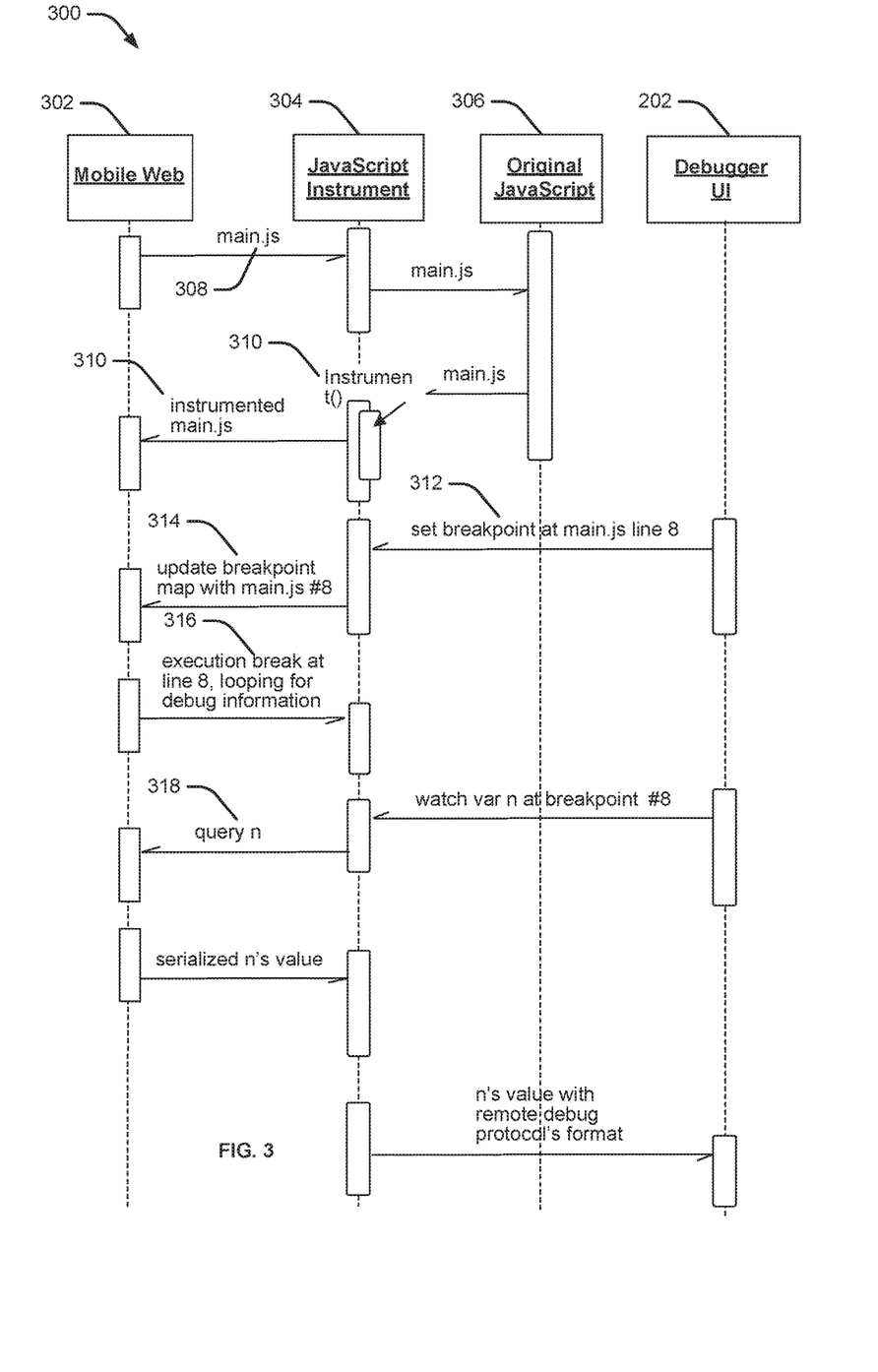
FIG. 3 illustrates an exemplary timeline that illustrates a debugging session timeline as described in present the implementations herein.

FIG. 3 shows a timeline 300 that illustrates a debugging session timeline as described in the present implementations herein.

As shown, the timeline 300 illustrates a mobile web 302, a JavaScript® instrument 304, an original JavaScript® 306, and the debugger UI 202. Furthermore, the timeline 300 shows a main JavaScript® code (main.js) 308, an instrumented main.js 310, a set breakpoint 312, an update breakpoint 314, and other steps for standard debugging procedure.

When the debugging feature of the device 104 is enabled, the mobile web 302 communicates to the original JavaScript® 306 the JavaScript® code i.e., main.js 308 of the webpage that it is trying to debug. At this state, the original JavaScript® 306 loads the main.js 308 and perform instrumentation on this JavaScript® code (main.js 308). For example, the original JavaScript® 306 executes a program protocol to condition the main.js 308 for debugging purposes. In this example, the subsequent debugging that may be performed, for example, by the debugger UI 202 is independent of the operating system that is implemented on the mobile web 302.

Figure 7:
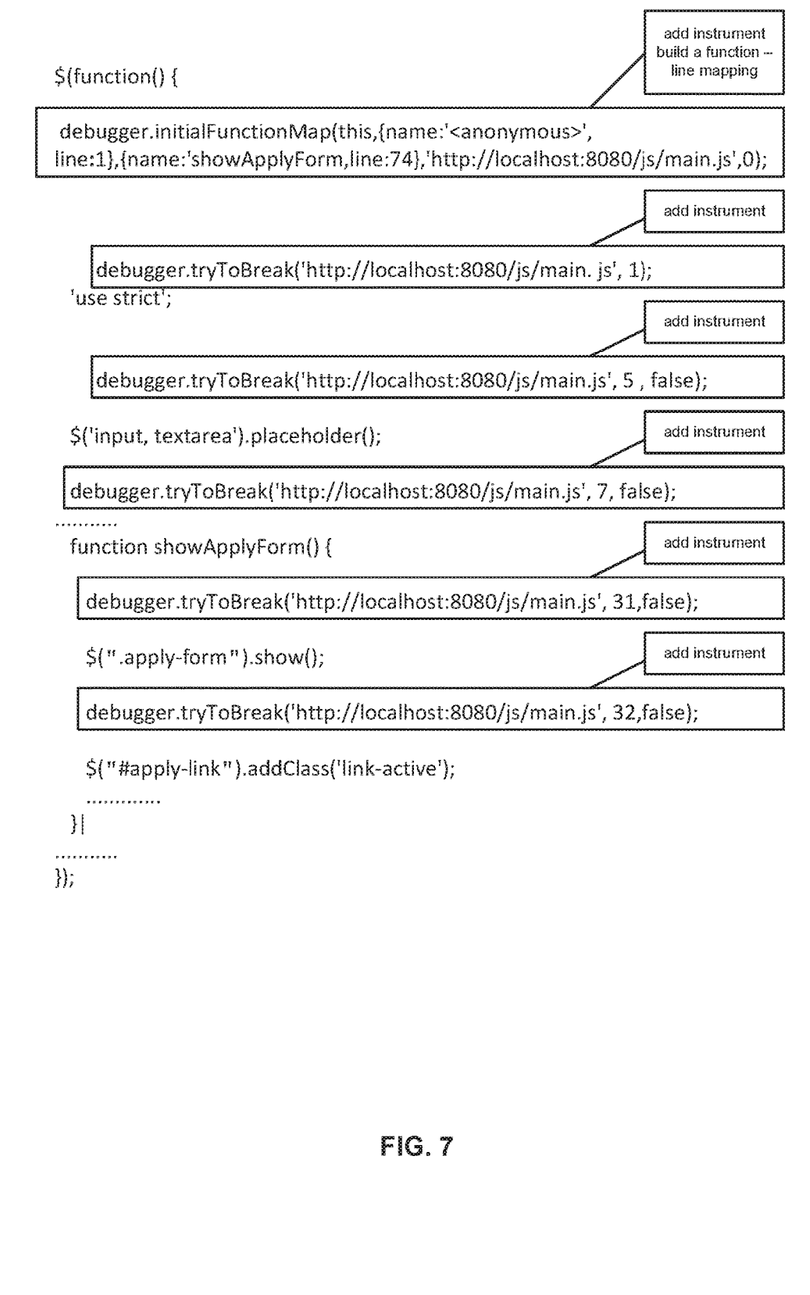
FIG. 7 illustrates a code snippet for executing a debugging function with reference to instrumentation in original JavaScript®, as described in the present implementations herein.

In an implementation, the instrumentation made at the original JavaScript® 306 may include insertion of a debug insertion to the main.js 308. For example, the instrumented main.js 308—during execution—may take a breakpoint according to manipulated breakpoints settings, and re-order the entry point line of each function inside of its JavaScript® code. For the debugging to go into this function, is implemented for example, as shown in FIG. 7.

With continuing reference to FIG. 3, the original JavaScript 306 manipulates the main.js 308 to become the instrumented main.js 310. The instrumented main.js 310 is received by the mobile web 302 and the debugger UI 202 may now perform live debugging on the instrumented main.js 310 of the webpage that is currently running at the mobile web 302.

For example, the debugger UI 202 sets a breakpoint 312 at a script line of the main.js 308. In this example, the debugger UI 202 is performing live debugging of the main.js 308 through the proxy server 108. As shown, the timeline stages at the JavaScript® instrument 304 and the original JavaScript® 306 are performed at the proxy server 108.

With the live debugging by the debugger UI 202, the mobile web 302 may continuously execute the update breakpoint 314, execution break 316, query 318, etc. in order to debug the current webpage or main.js that is running at the mobile web 302.

Figure 4:
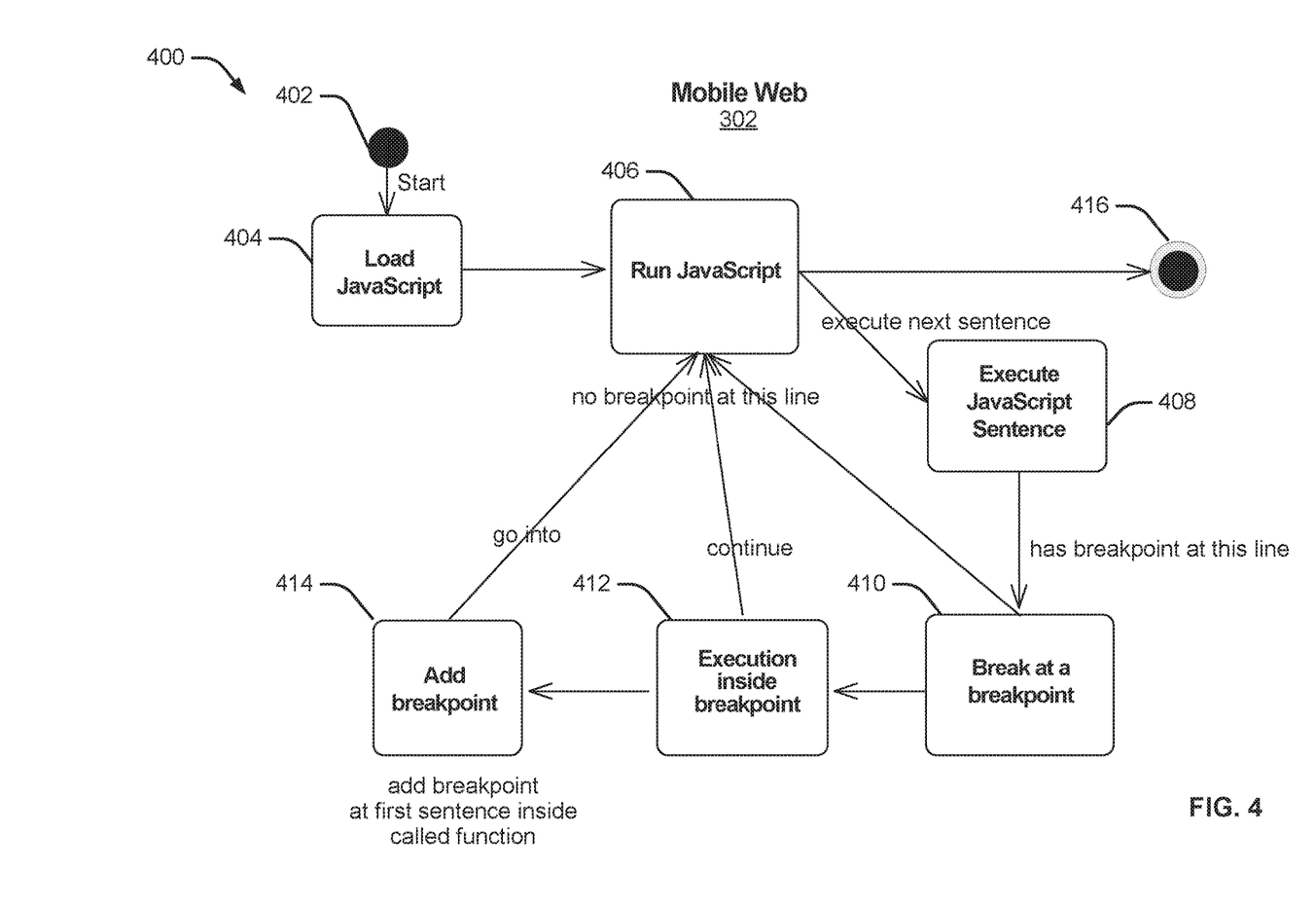
FIG. 4 illustrates an exemplary execution-diagram as described in the present implementations herein.

FIG. 4 shows an example execution diagram 400 as described in the present implementations herein. The execution diagram 400 illustrates loading and running of an instrumented JavaScript® code at the mobile web 302. At the same time, a remote debugging is performed on the instrumented JavaScript® code.

As shown, the stages in the execution diagram 400 includes a start 402, load-JavaScript® 404, a run-JavaScript® 406, an execute-JavaScript® 408, breakpoint 410, etc.

In an implementation, the start 402 illustrates the point or state when the debugging feature is enabled at the mobile web 302. With the enabling of the debugging feature, the mobile web 302 loads the instrumented JavaScript® code (e.g., instrumented main.js 308) at the load-javaScript 404 and runs the instrumented JavaScript® code at the run-JavaScript® 406.

The running of the JavaScript® code at the run-JavaScript® 406 may terminate at endpoint 416 or continue at the execute-JavaScript® 408. For example, if the running JavaScript® code has no debugging breakpoints during the execution of its codes or sentences, then the running of the JavaScript® code will terminate at the endpoint 416. Otherwise, the JavaScript® code continues at the execute-JavaScript® 408 to execute a sentence or line that includes a breakpoint.

At the breakpoint 410, the JavaScript® code executes the break at the sentence or line where the breakpoint is located. In addition, the breakpoint may include another function and this function is executed at execute-inside-breakpoint 412.

At add-breakpoint 414, the debugging of the JavaScript® code may add additional breakpoint within the function that is executed inside the first breakpoint.

Figure 5:
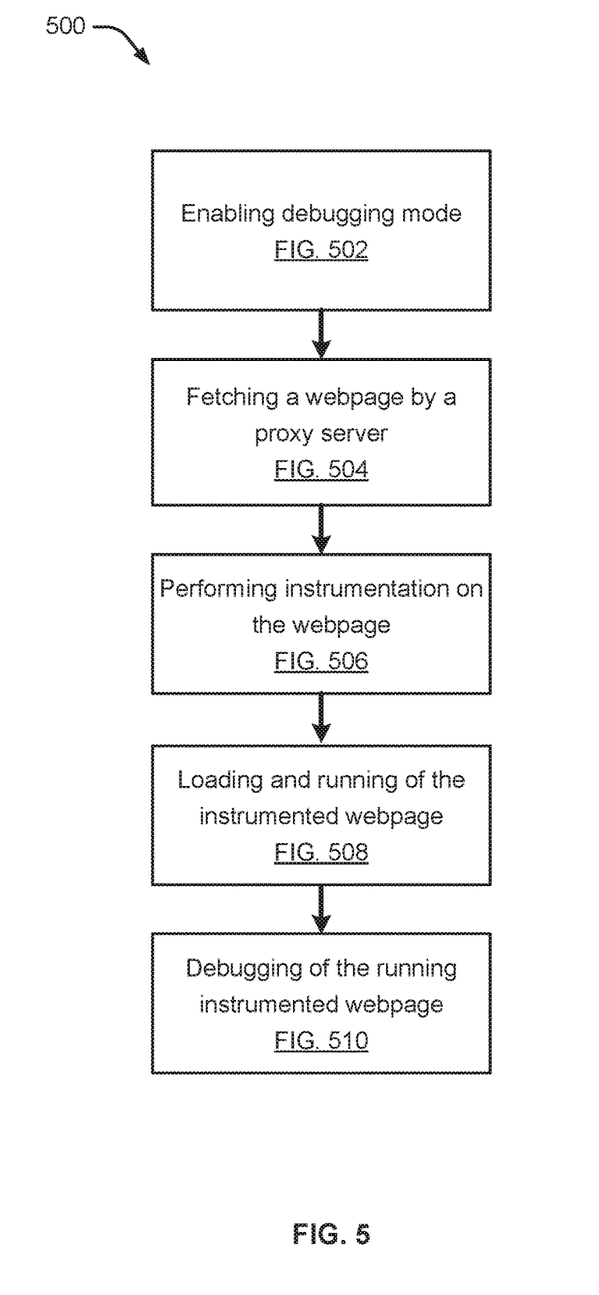
FIG. 5 illustrates exemplary process for implementing, at least in part, the technology described herein.

FIG. 5 illustrates an exemplary process 500 for implementing, at least in part, the technology described herein. In particular, process 500 depicts a flow to implement a cross-platform remote debugging in mobile web applications. The process 500 may be performed by a computing device or devices. An example architecture of such a computer device is described below with reference to FIG. 6. In this particular example, the process 500 describes that certain acts are be performed at or by a user or a system.

At 502, a debugging mode is enabled. For example, a user enables remote debugging feature of the target browser (e.g., mobile web 302) as illustrated in start 402 of FIG. 4.

At 504, a webpage may be fetched by a proxy server. For example, upon enabling of the debugging mode, the proxy server (i.e., proxy server 108) fetches the webpage (e.g., webpage 208) from the website 110 or server. In another example, the webpage 208 may already be running at the mobile web 302 and the webpage 208 is communicated to the proxy server 108.

At 506, instrumentation may be performed on the fetched webpage by the proxy server. For example, the proxy server 108 is a self-based software that implements a protocol to configure or perform instrumentation on JavaScript code of the fetched webpage 208. In this example, the proxy server 108 prepares the JavaScript code to be managed by a debugger UI (e.g., debugger UI 202) using a development tool such as the Google® Chrome® development tool 204.

Figure 8:
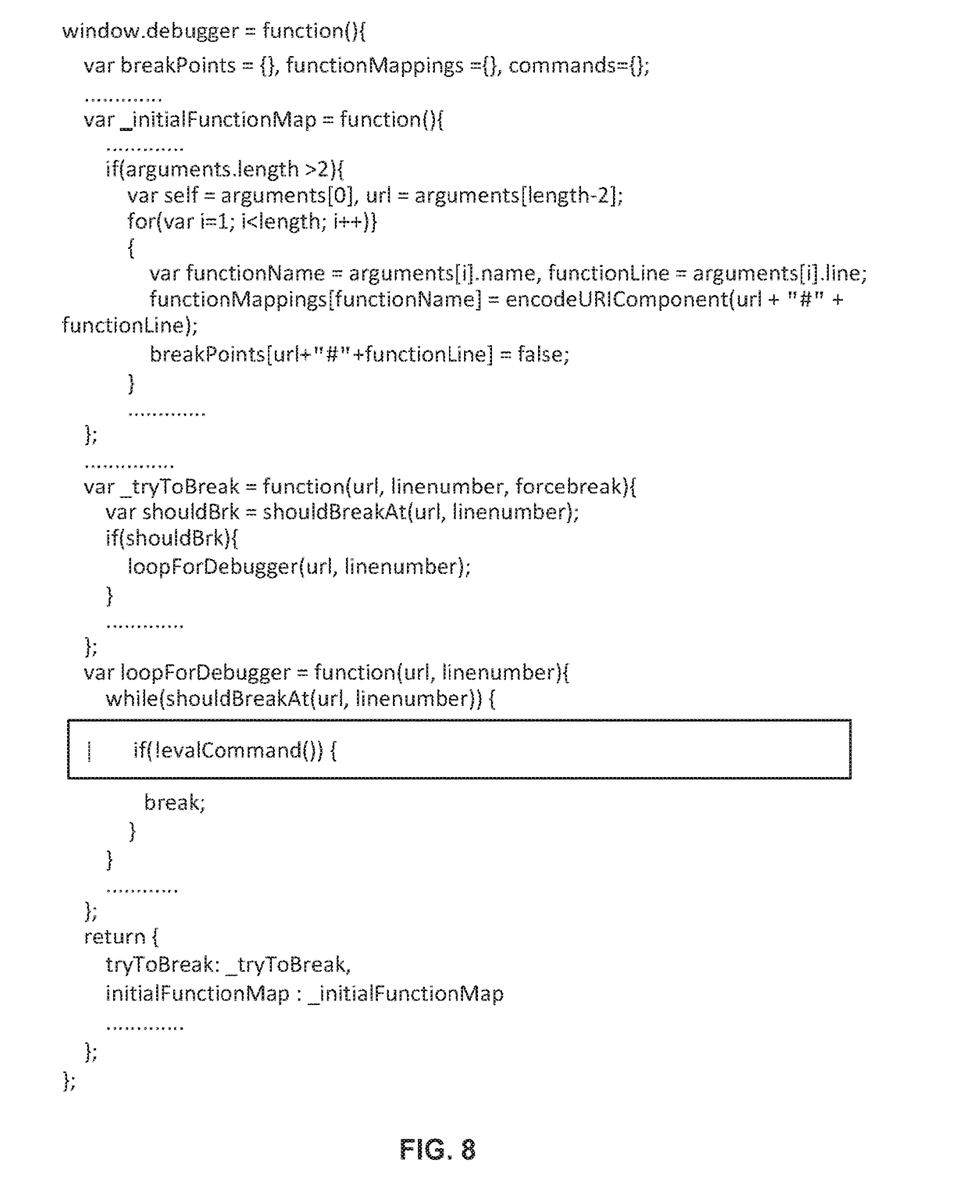
FIG. 8 illustrates a code snippet for executing a debugging function with reference to instrumentation performed by a proxy server, as described in the present implementations herein.

In an implementation, the instrumentation performed by the proxy server 108 inserts or injects a debugger.js (i.e., debugger JavaScript code) into the fetched webpage 208. For example, the debugger.js may be implemented as shown in FIG. 8.

At 508, loading and running of the instrumented webpage is performed. For example, after the proxy server 108 performs instrumentation on the webpage 208, the instrumented webpage 208 is communicated back by the proxy server 108 to the target browser or the mobile web 302. The loaded webpage 208 may then run in the mobile web 302.

At 510, debugging may be performed on the running instrumented webpage. For example, the debugger UI 202 sets up a breakpoint at a code of the loaded instrumented webpage 208. In this example, the debugger UI 202 utilizes, for example, the Google® Chrome® development tool 204 to access the proxy server 108 and insert a breakpoint in the JavaScript® code of the instrumented webpage 208.

While the mobile web 302 is running the instrumented JavaScript of webpage 208, the instrumented webpage 208 may call "shouldBreakAt(url, linenumber)" method to query whether there has been a breakpoint for this file before a very statement. A debugging client development tool (e.g., Google® Chrome® development tool 204) may tell the debugger.js to set breakpoints lively.

Figure 6:
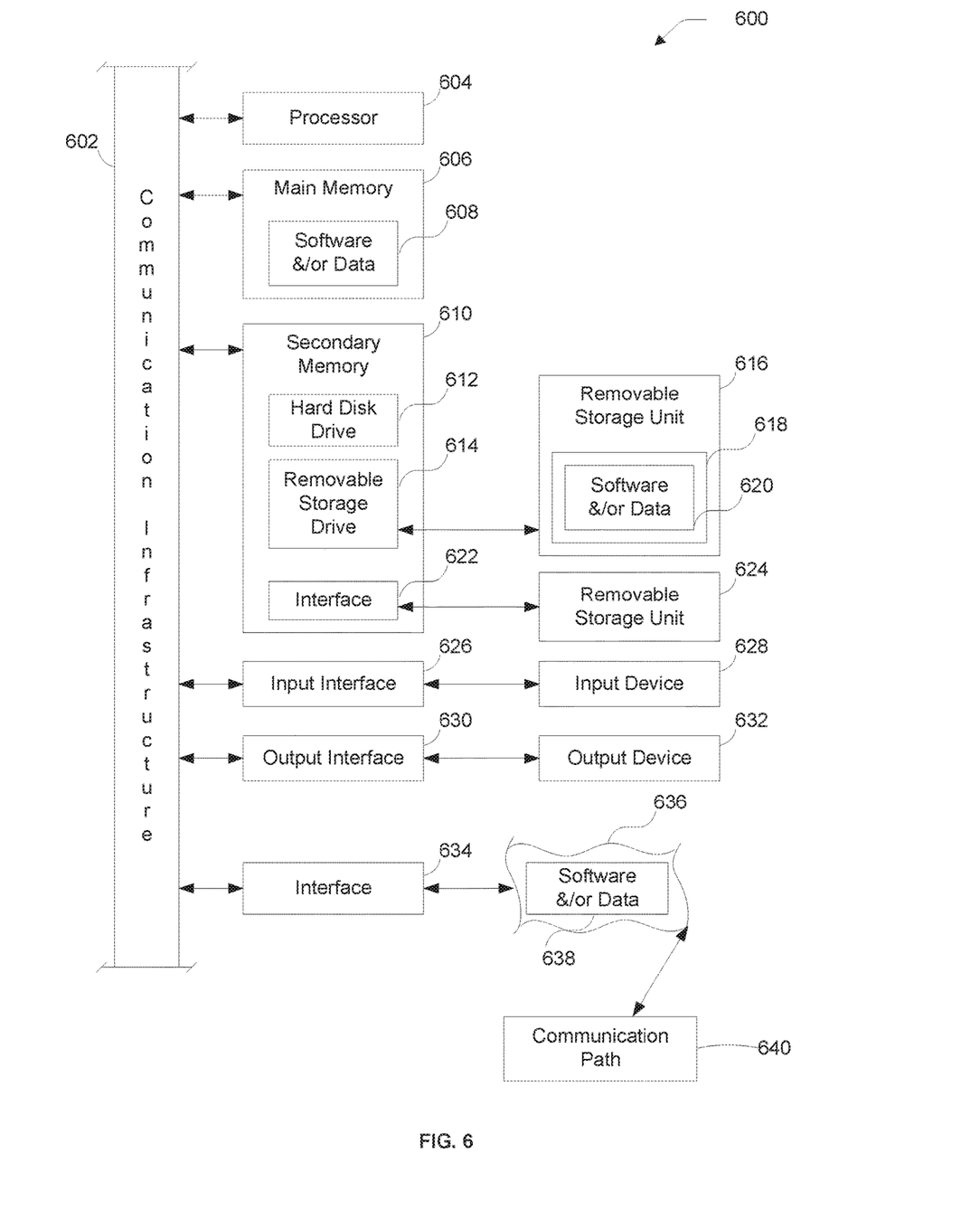
FIG. 6 illustrates an exemplary computing system to implement in accordance with the technologies described herein.

FIG. 6 illustrates an exemplary system 600 that may implement, at least in part, the technologies described herein. The computer system 600 includes one or more processors, such as processor 604. Processor 604 can be a special-purpose processor or a general-purpose processor.

Processor 604 is connected to a communication infrastructure 602 (for example, a bus or a network). Depending upon the context, the computer system 600 may also be called a client device.

Computer system 600 also includes a main memory 606, preferably Random Access Memory (RAM), containing possibly inter alia computer software and/or data 608.

Computer system 600 may also include a secondary memory 610. Secondary memory 610 may include, for example, a hard disk drive 612, a removable storage drive 614, a memory stick, etc. A removable storage drive 614 may include a floppy disk drive, a magnetic tape drive, an optical disk drive, a flash memory, or the like. A removable storage drive 614 reads from and/or writes to a removable storage unit 616 in a well-known manner. A removable storage unit 616 may include a floppy disk, a magnetic tape, an optical disk, etc. which is read by and written to by removable storage drive 614. As will be appreciated by persons skilled in the relevant art(s) removable storage unit 616 includes a computer usable storage medium 618 having stored therein possibly inter alia computer software and/or data 620.

In alternative implementations, secondary memory 610 may include other similar means for allowing computer programs or other instructions to be loaded into computer system 600. Such means may include, for example, a removable storage unit 624 and an interface 622. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 624 and interfaces 622 which allow software and data to be transferred from the removable storage unit 624 to computer system 600.

Computer system 600 may also include an input interface 626 and a range of input devices 628 such as, possibly inter alia, a keyboard, a mouse, etc.

Computer system 600 may also include an output interface 630 and a range of output devices 632 such as, possibly inter alia, a display, one or more speakers, etc.

Computer system 600 may also include a communications interface 634. Communications interface 634 allows software and/or data 638 to be transferred between computer system 600 and external devices. Communications interface 634 may include a modem, a network interface (such as an Ethernet card), a communications port, a Personal Computer Memory Card international Association (PCMCIA) slot and card, or the like. Software and/or data 638 transferred via communications interface 634 are in the form of signals 636 which may be electronic, electromagnetic, optical, or other signals capable of being received by communications 634. These signals 636 are provided to communications interface 634 via a communications path 640. Communications path 640 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 616, removable storage unit 624, and a hard disk installed in hard disk drive 612. Computer program medium and computer usable medium can also refer to memories, such as main memory 606 and secondary memory 610, which can be memory semiconductors (e.g. Dynamic Random Access Memory (DRAM) elements, etc.). These computer program products are means for providing software to computer system 600.

Computer programs (also called computer control logic) are stored in main memory 606 and/or secondary memory 610. Such computer programs, when executed, enable computer system 600 to implement the present technology described herein. In particular, the computer programs, when executed, enable processor 604 to implement the processes of aspects of the above. Accordingly, such computer programs represent controllers of the computer system 600. Where the technology described herein is implemented, at least in part, using software, the software may be stored in a computer program product and loaded into computer system 600 using removable storage drive 614, interface 622, hard disk drive 612 or communications interface 634.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method of cross-platform remote debugging in mobile web application, the method comprising:
   enabling a debugging mode by a user on a target browser implemented on a client device using a remote debugging client application on the client device;
   in response to the enabling the debugging mode, providing a requested webpage for debugging to a proxy server embedded in the client device where the target browser is implemented;
   performing, by the proxy server, instrumentation on the requested webpage to create an instrumented webpage, wherein the instrumentation on the webpage transforms codes of the webpage to be capable of manipulation, wherein the instrumented webpage includes manipulated breakpoint settings;
   loading and running the instrumented webpage on the target browser on the client device; and
   performing live debugging of the instrumented webpage running on the target browser using a debugger user interface (UI) on the client device for the remote debugging client application and wherein debugging is performed independent of an operating system of the client device, wherein the performing live debugging of the instrumented webpage further comprises:
   running a code of the instrumented webpage in the target browser,
   inserting a breakpoint by the debugger user interface (UI) through the proxy server, and
   updating a breakpoint in the code of the instrumented webpage, wherein the updating of the breakpoint is independent of a platform or operating system that is running in the target browser.

2. The method according to claim 1, wherein the proxy server is located on the client device and acts as a middleware between the target browser and the remote debugging client application.

3. The method according to claim 1, wherein performing the instrumentation includes executing, by the proxy server, a protocol that facilitates or conditions a JavaScript code of the requested webpage to be debugged by the remote debugging client application.

4. The method according to claim 1, wherein the debugging is performed by using the remote debugging client application that utilizes a development tool to access the proxy server.

5. The method according to claim 1, wherein the code of the instrumented webpage comprises a JavaScript code.

6. The method according to claim 1, wherein the remote debugging client application utilizes a Google® Chrome® development tool to connect with the proxy server.

7. The method according to claim 1, wherein providing the requested webpage includes fetching the requested webpage that is currently running at the target browser or the webpage that is stored in a web site or server.

8. A device that facilitates cross-platform remote debugging in mobile web applications, the device comprising:
a processor unit of the device;
a target browser implemented on the device;
a remote debugger user interface (UI) on the device;
a proxy server embedded in the device;
a development tool that facilitates a connection between the remote debugger UI and the proxy server; and
wherein when a user enables a debug mode using the remote debugger UI on the device,
sending a request for a requested webpage by the target browser, retrieving the requested webpage by the proxy server, instrumenting the requested webpage retrieved by the proxy server to create an instrumented webpage, wherein the instrumented webpage includes manipulated breakpoint settings,
loading and running the instrumented webpage on the target browser on the device, and
debugging the instrumented webpage running on the target browser using the remote debugger UI on the device, the debugging is implemented through the proxy server using the development tool, the debugging is performed independent of an operating system utilized by the target browser, wherein the debugging of the instrumented webpage further comprises:
running a code of the instrumented webpage in the target browser, inserting a breakpoint by the debugger user interface (UI) through the proxy server, and
updating a breakpoint in the code of the instrumented webpage, wherein the updating of the breakpoint is independent of a platform or operating system that is running in the target browser.

9. The device according to claim 8, wherein the proxy server acts as a middleware between the target browser and a website, wherein the website stores the webpage.

10. The device according to claim 8, wherein the proxy server acts as a middleware between the target browser and a remote debugging client application, the remote debugging client application includes the remote debugger UI.

11. The device according to claim 8, wherein the proxy server includes a protocol that conditions or transforms the requested webpage for debugging purposes.

12. The device according to claim 8, wherein the development tool is a Google® Chrome® development tool.

13. One or more non-transitory computer-readable media storing processor-executable instructions that when executed cause one or more processors to perform operations that facilitate cross-platform remote debugging in mobile web applications comprising:
enabling a debugging mode by a user using a remote debugging client application on a client device;
sending a request by a target browser implemented on the client device to a proxy server embedded in the client device for a requested webpage;
fetching, by the proxy server, the requested webpage in response to the request by the target browser;
performing, by the proxy server, instrumentation on the requested webpage fetched by the proxy server to create an instrumented webpage, wherein the instrumented webpage includes manipulated breakpoint settings;
loading and running the instrumented webpage on the target browser on the client device; and
debugging the instrumented webpage running on the target browser on the client device, wherein debugging using a debugger user interface (UI) of the remote debugging client application, wherein debugging is independent of an operating system utilized by the target browser, wherein the debugging of the instrumented webpage further comprises:
running a code of the instrumented webpage in the target browser,
inserting a breakpoint by the debugger user interface (UI) through the proxy server, and
updating a breakpoint in the code of the instrumented webpage, wherein the updating of the breakpoint is independent of a platform or operating system that is running in the target browser.

14. The one or more non-transitory computer-readable media according to claim 13, wherein the proxy server acts as a middleware between the target browser and a website, wherein the website stores the webpage.

15. The one or more non-transitory computer-readable media according to claim 13, wherein the proxy server acts as a middleware between the target browser and the remote debugging client application.

16. The one or more non-transitory computer-readable media according to claim 13, wherein performing the instrumentation includes executing a protocol by the proxy server, the protocol facilitates or conditions a JavaScript code of the requested webpage to be debugged by the remote debugging client application.

17. The one or more non-transitory computer-readable media according to claim 13, wherein the debugging is performed by using the remote debugging client application that utilizes a development tool to access the proxy server.

18. The one or more non-transitory computer-readable media according to claim 13, wherein the code of the instrumented webpage comprises a JavaScript code.

* * * * *